United States Patent
Kwan

Patent Number: 6,092,847
Date of Patent: Jul. 25, 2000

[54] GRAVITY LOCKABLE TONGS

[75] Inventor: Steven Chi Fai Kwan, Arcadia, Calif.

[73] Assignee: Merry Chance Industries, Ltd., Arcadia, Calif.

[21] Appl. No.: 09/310,292

[22] Filed: May 12, 1999

[51] Int. Cl.[7] .............................. A47G 21/10; A47J 43/28
[52] U.S. Cl. ............................ 294/16; 294/99.2; 294/106
[58] Field of Search .................................. 294/3, 8.5, 11, 294/16, 28, 33, 99.2, 100, 110.1, 106

[56] References Cited

U.S. PATENT DOCUMENTS

| | | | |
|---|---|---|---|
| 772,566 | 10/1904 | Holowell | 294/99.2 |
| 2,839,325 | 6/1958 | Jeanfavre | 294/16 |
| 2,864,645 | 12/1958 | Meldrum | 294/106 |
| 4,609,132 | 9/1986 | Brokenshire . | |
| 5,199,756 | 4/1993 | Bartlett et al. . | |

*Primary Examiner*—Dean J. Kramer
*Attorney, Agent, or Firm*—Greenberg Traurig, LLP; Anthony R. Barkume

[57] ABSTRACT

A set of locking tongs comprising a first arm and a second arm each comprising a hinge end and a grasping end. Hinge members are provided for pivotably connecting the first and second arms together at the hinge ends, so that the arms can pivot between an open position and closed position. Spring members are included for biasing the arms in an open position. The locking member comprises a captured pin attached to the first arm and an aperture member attached to the second arm. The captured pin has a pin that moves under the effects of gravity within a contained range of motion, limited by a bracket. The second arm has an aperture located on a surface. When the tongs are held in an attitude such that gravity can act upon the pin, the pin will engage the aperture and prevent the tongs from opening. The outward force applied by the spring acts to retain the pin in its locked position through frictional forces thus resisting opening. When the arms are depressed thereby relieving the force felt by the sides of the pin against the aperture, and oriented such that the pin can move under the affect gravity, the lock may be disengaged.

11 Claims, 2 Drawing Sheets

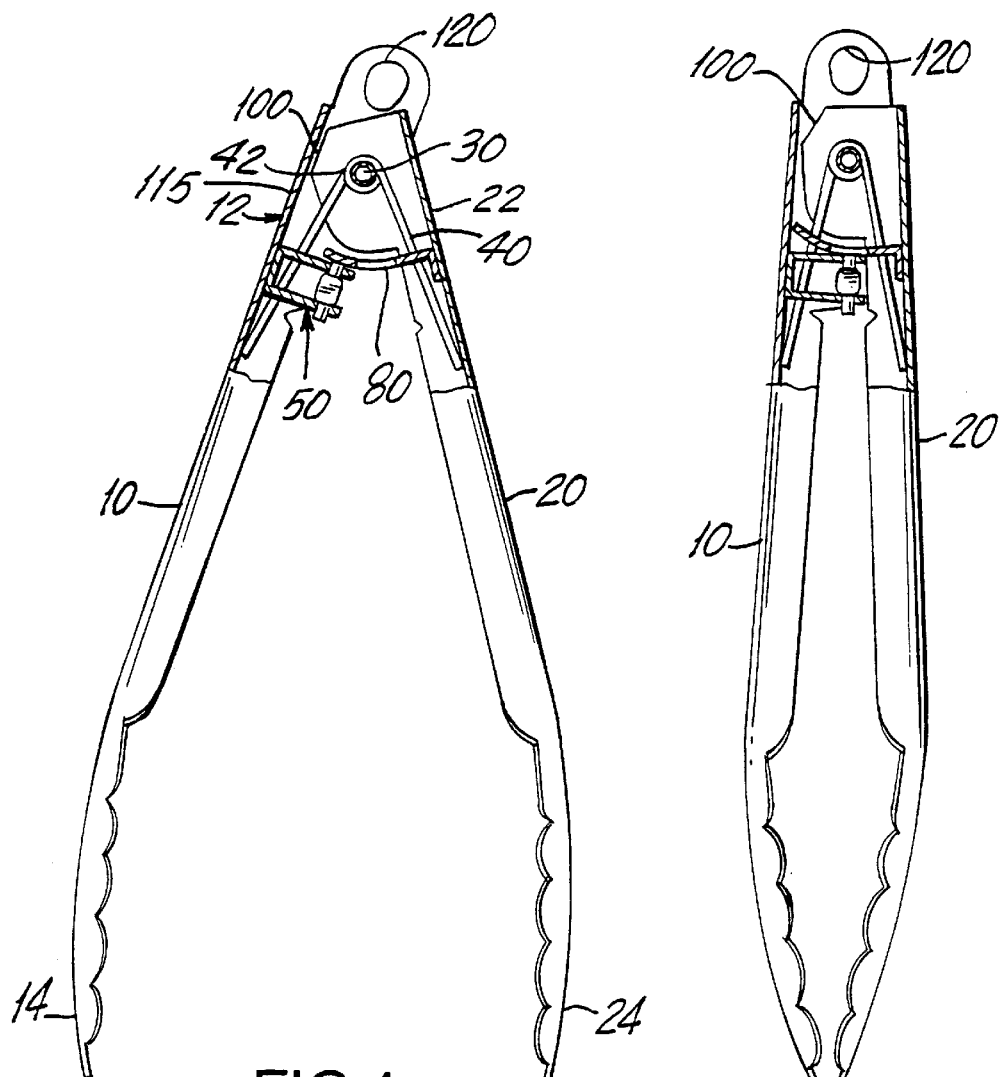
FIG.1
FIG.2
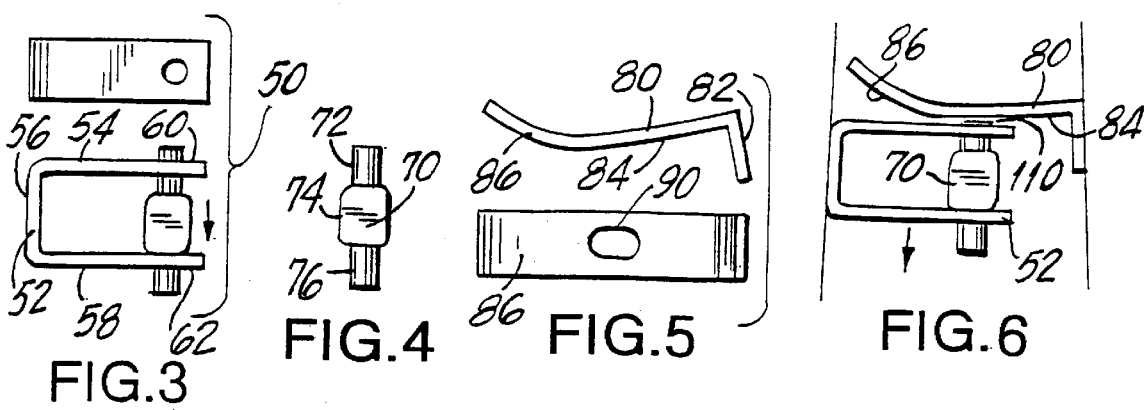
FIG.3
FIG.4
FIG.5
FIG.6

GRAVITY LOCKABLE TONGS

BACKGROUND OF THE INVENTION

The present invention relates to grasping devices such as tongs used to handle food, which may be locked in a closed position for storage using a gravity-based locking means.

Spring-loaded tongs are commonly used to handle food and provide a convenient way to grasp objects to be temporarily transported. The spring is biased to urge the tongs to an open position such that they are ready for immediate use.

One problem with spring loaded tongs is that the tongs take up a significant amount of space if left in the open condition. This is typically not a problem when the tongs are used, but becomes undesirable when the tongs are to be stored. If the tongs are compressed and placed in a drawer, the spring action of the tongs may cause them to open rendering the drawer difficult to open.

Various methods have been employed to reduce the storage area required for spring loaded tongs. One method as proposed in U.S. Pat. No. 5,199,756 discloses a movable lock actuated by manually sliding a locking plate to a position where the tong arms are restricted from moving. This locking plate is engaged or disengaged by applying force to the plate, requiring the user to hold the tongs in a closed position with one hand while sliding the locking plate into an engaged or disengaged position with the other hand.

External means for retaining the tongs in a closed position may be applied such as provided by rubber bands or some other method of securing the tong arms in a closed position. These methods are less than satisfactory and may lead to the tongs springing open upon failure or dislodging of this external restraint. Rubber bands are likewise unsuitable because the rubber breaks down over time leaving residue on the utensil.

The prior art methods require the use of two hands or changing hand positions in order to affect the locking mechanism, rendering them difficult to close by people having reduced or limited functionality of a hand.

U.S. Pat. No. 4,609,132, discloses a gravity-based locking device used for hanging clothes. This hanger provides a locking mechanism that uses a cylinder placed between two angled surfaces that rides on a shaft. The mechanism used can trap clothes of variable thicknesses between the first and second arms while providing a suitable operation for a hanger. The '132 mechanism, while providing a method for a variable thickness gravity based locking mechanism does not offer a suitable mechanism for use in tongs since the tongs lock in only a fully closed position.

What is desired therefore is an improved set of tongs or grasping devices that may be operated easily by one hand, that has a simple method of locking and unlocking using gravity to actuate the locking mechanism.

SUMMARY OF THE INVENTION

It is an object of the present invention to overcome the limitations of prior art methods of locking tongs by using a gravity-based mechanism to allow a user to lock and unlock tongs using one hand. The tongs comprise a first arm and a second arm each comprising a hinge end and a grasping end. Hinge means is provided for pivotably connecting the first and second arms together at the hinge ends, so that the arms can pivot between an open position and closed position. Spring means are included for biasing the arms in an open position.

The gravity locking means comprises a captured pin means attached to the first arm and an aperture means attached to the second arm. The captured pin means has a pin means that moves under the effects of gravity within a containment means having a contained range of motion. The aperture means of the second arm has an engagement area located on a slideable.surface. When the tongs are held in an attitude such that gravity can act upon the pin means and the arms are pressed toward each other, the pin means will engage the aperture means to lock the tongs. When the arms are released the outward force applied by the spring means against the pin means will prevent the tongs from opening. In order to free the pin means the arms of the tongs are depressed to relieve the lateral force felt by one side of the pin against the aperture. If the tongs are oriented such that the pin means can move under the affect of gravity, the lock may be disengaged.

The aperture means may comprise an elongated aperture where the pin is in slideable contact with the slideable surface of the aperture means. When the first and second arms are pressed together, the pin means passes over the aperture and the end of the pin means falls due to gravity into the aperture. When the arms are released, the spring acts to move the arms apart, thereby bringing the pin means into contact with the first edge of the aperture means to hold the pin means in place.

BRIEF DESCRIPTION OF THE DRAWINGS

FIG. 1 is a view of the opened locking tongs of the present invention in a disengaged orientation.

FIG. 2 is a view of the closed locking tongs of the present invention in a disengaged orientation.

FIG. 3 is a detailed view of the captured pin means of the locking mechanism of the present invention.

FIG. 4 is a detailed view of the pin means for the present invention.

FIG. 5 is a detailed view of the slideable surface of the present invention.

FIG. 6 is a detailed view of the gravity locking means of the present invention shown in the disengaged mode.

DETAILED DESCRIPTION OF THE PREFERRED EMBODIMENT

Figure 7:
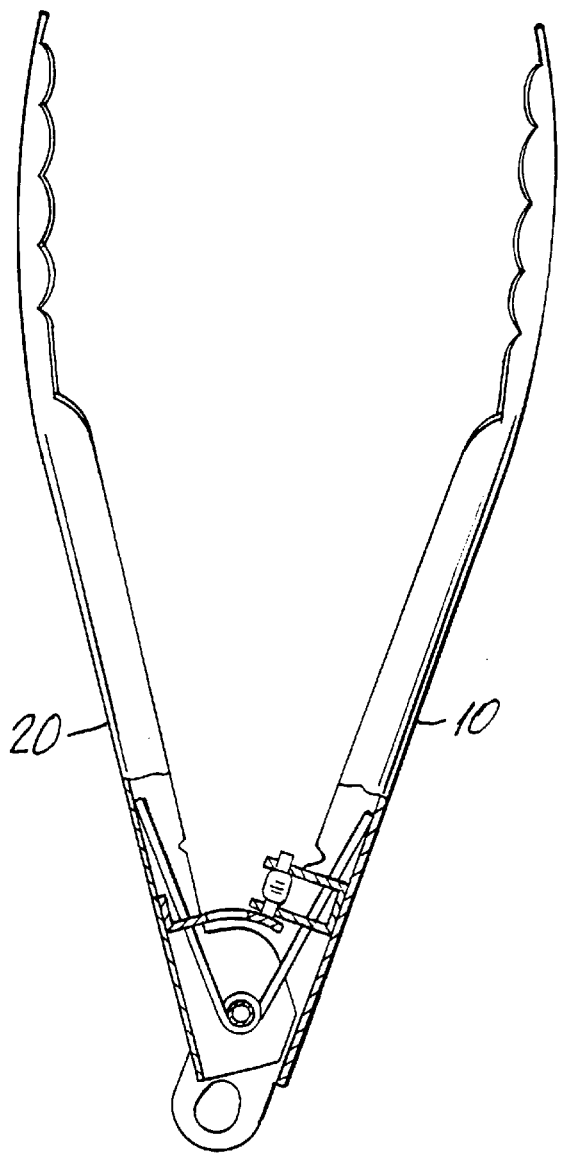
FIG. 7 is a view of the open gravity lockable tongs in the engageable orientation.

Referring to FIGS. 1 and 2, the general configuration of the tongs is shown in the open and closed position. In the preferred embodiment the tongs arms are made of stainless steel, but other implementations may utilize plastic, ceramic or wood or any other material providing the strength to allow the tongs to grasp an object. The tongs have a first arm 10 and a second arm 20 where the first arm has a hinge end 12 and a grasping end 14 and the second arm has a hinge end 22 and a grasping end 24. In the preferred embodiment, the grasping ends have the general configuration as shown in FIG. 1, but other grasping shapes may also be employed. A hinge pin 30 is located at the hinge end of the first arm 12 and second arm 22 to join the hinge ends together.

A spring means 40 is used to apply force to bias the arms in an open position as shown in FIG. 1. In the preferred embodiment, the spring means is a wound wire made of spring steel which must be compressed from its natural state during assembly of the tongs to allow sufficient force to cause the arms to remain in the open position. Other materials or types of force generating mechanisms may be employed to achieve the same effect. In the preferred embodiment, the hinge pin 30 is used to retain the spring 40 by placing the pin through the central winding 42 of the spring 40.

A gravity locking mechanism is employed to retain the tongs in a closed position such that the tongs may be easily handled or stored. The gravity locking mechanism as shown in FIG. 3 comprises a first member attached to the first arm 10 and a second member attached to the second arm 20 that mutually cooperate to lock and unlock the tongs based on a simple one-handed mode of operation. The first member comprises captured pin means 50 which is made of a pin means 70 and containment means 52. In the preferred embodiment the pin means and the containment means are made of stainless steel. The containment means is a simple bracket 52 attached to the first arm 10 along one edge 56 and may generally have a 'C' shape. The C-shaped containment means 52 has a first bracket leg 54, a base 56 and a second bracket leg 58. The base 56 of the containment means 52 may be attached to the first arm 10 by either a weld joint, adhesives, rivets or other mechanical joining method as is known by those skilled in the art. In the preferred embodiment, the first bracket leg 54 and second bracket leg 58 have apertures 60, 62 located in a straight line such that an axis is formed through which a pin may be inserted. In the preferred embodiment the pin means 70 may be made from a straight pin having a length longer than the opening of the containment means such that the pin ends 72, 76 extend beyond the first bracket leg 54 and second bracket leg 58 (see FIG. 4). The middle region 74 of the pin is of a larger size than the apertures 60, 62 of the bracket legs such that the pin cannot be removed but may be free to travel for a limited distance between the first bracket leg 54 and the second bracket leg 58. The ends of the pin 72,76 are smooth and the middle region 74 is increased in size for a limited portion thereof corresponding to the desired free travel of the pin 70. The pin means is allowed to travel within the containment means based on gravity where the middle region 74 may be located against the first bracket leg 54 or the second bracket leg 58 based on the orientation of the containment means. As can be appreciated by those skilled in the art, it is not necessary to completely invert the containment means in order to cause the pin means 70 to slide through the apertures 60, 62 in the first and second bracket legs 54, 58 from one extreme to the other, but to merely change the orientation a small amount such that the weight of the pin may cause the pin to overcome the frictional forces between the pin ends 72, 76 and the bracket apertures 60, 62 to cause the pin 70 to slide freely.

In the preferred embodiment the second member of the gravity locking means is the aperture means 80 which comprises a slideable surface 84,86 an engagement area 90 and a joining area 82 (see FIG. 5, 6). The aperture means is attached to the second arm of the tongs by attaching the joining area 82 to the second arm 20 such that the aperture means is located in substantial alignment with the captured pin means 50 (see FIG. 5). The slideable surface of the aperture means 80 comprises a substantially straight portion 84 and a curved portion 86 such that the curved portion 86 is a constant radial distance from the hinge 30. When the tong arms are opened and closed, the gap between the pin end 72 of the captured pin means and the curved portion 86 of the slideable pin means is substantially constant. The engagement area 90 of the aperture means comprises an aperture located on the slideable surface 84 in alignment with the pin means 70 when the tongs are in a closed position. In one embodiment the diameter of the aperture 90 is slightly larger than the pin diameter 72. Alternatively the diameter of the aperture 90 may be slotted with the length of the slot aligned with the direction of closure of the tong arms.

In order to utilize the tongs of this invention, the user grasps the tongs in a typical manner and approaches the target material to be picked-up from above with the grasping ends oriented below the hinged ends of the tongs. As the user presses the tong ends together, the grasping ends engage the target material. During this operation, since the tongs are oriented as shown in FIG. 2, the locking mechanism is not engaged because the weight of the pin disposes the pin toward the lowest point (see FIG. 6) where a noticeable gap 110 is maintained between the pin end 72 and the slideable surfaces 84,86.

Figure 8:
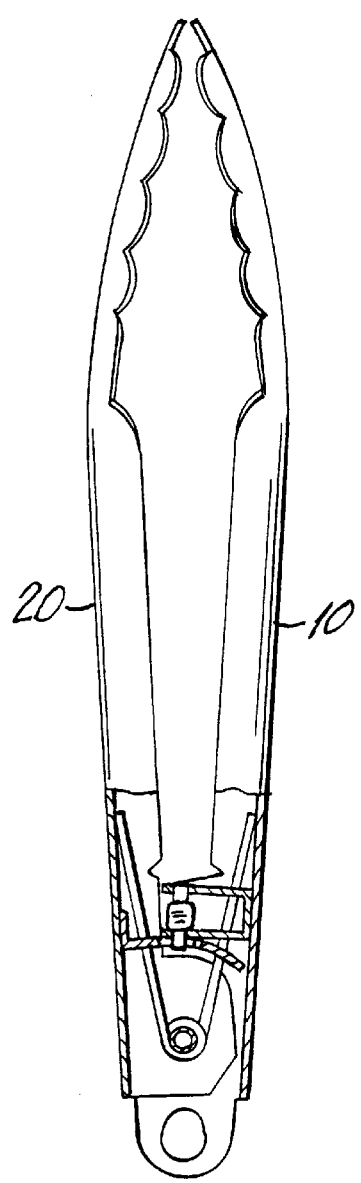
FIG. 8 is a view of the closed gravity lockable tongs in the engageable orientation.
Figure 9:
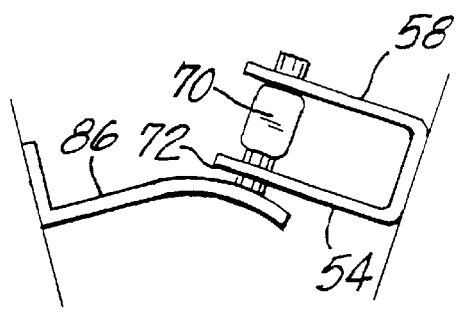
FIG. 9 is a view of the open gravity locking mechanism when the pin means is in contact with the slideable aperture means surface.
Figure 10:
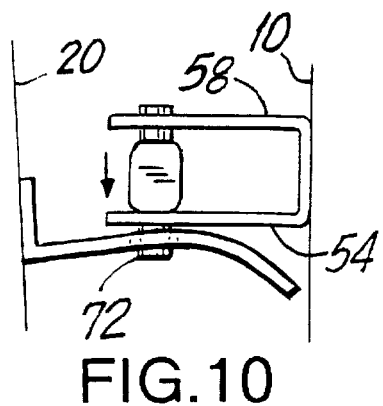
FIG. 10 is a detailed view of the closed gravity locking mechanism where the pin means is in the engaged position.

The gravity locking mechanism of this invention locks in a closed position by changing the orientation of the locking tongs so that the pin means 70 slides from a disengaged position to an engaged position and depressing the tong arms toward each other a sufficient distance to allow the pin means 70 to be aligned with the engagement area 90 of the aperture means. These steps may be performed in any order. As previously described the pin means will slide from the disengaged position to the engaged position by changing the orientation of the tongs. FIGS. 7, 8, and 9 and 10 show the tongs and locking mechanism in an inverted orientation suitable for engagement. In order to lock the tongs in a closed position, the user may press the tong grasping ends 14, 24 toward each other by applying pressure to the tong arms 10,20 and move the grasping ends above the horizontal plane with respect to the gravity locking means in order for the pin means to overcome frictional resistance between the pin means and the containment means as previously described. Alternatively, the user may orient the grasping ends of the tong arms as just described and then apply pressure to the tong arms. When the tong arms have closed sufficiently to allow the pin means to engage the aperture means the pin means will slide into the aperture means. As the pressure is released on the tong arms, the engaged pin means is held in place by the lateral forces translated from the spring means 40 through the tong arms through the two members of the locking mechanism. This lateral force exists as long as the tongs are in the closed position. Once the pin means is engaged, the tongs may be oriented in any attitude where they will remain closed.

To open the locked tongs the user must orient the grasping ends 14, 24 at an attitude lower than the gravity locking means 50, 80 and slightly depress the tong arms 10, 20 to relieve the lateral force felt by the pin means so the pin means may simply slide under its own weight.

In the preferred embodiment the tongs are made of formed stainless steel where one arm is formed to fit inside the other arm at the hinged end and are held together by the hinge pin so that they may rotate about the hinge with little interference. The tong grasping ends have scalloped edges. The surface of the tongs have a smooth exterior, but may be modified to have external gripping areas which may include ridges or roughend areas. The hinged end of the tongs have a range limiting edge 100 located near the hinge, to restrict the separation of the grasping ends of the tongs. When the tongs are in the open position the range limiting edge 100 controls the relative angle between the tong arms by banking on the interior surface 115 of the opposing tong arm (see FIG. 1).

Since there are no external mechanisms to lock and unlock the tongs and no user manipulation of the internal components of the locking mechanism is required, these tongs may be easily operated by one hand. It should be understood that simple modifications to the shape of the tong ends, arms and spring means can be made within the sprit of this invention.

Additionally the locking mechanism is useable in other applications where the locking mechanism is adjusted to lock the mechanism in the same manner as described in this specification. It is also possible to modify the location of the aperture means so that it is located below the pin capture means. This would cause the mechanism to lock when the operable mode would require a device to lock such that it is unlocked when the operable ends are oriented above the gravity locking mechanism.

In the preferred embodiment of the present invention the hinged end of the first tong arm 10 has a second aperture 120 (see FIG. 1) located at the end of the tong arm to allow the tongs to be hung on a protruding object such as a hook or nail.

What is claimed is:

1. Gravity lockable tongs for grasping items comprising:
   a first arm and a second arm each comprising a hinge end and a grasping end;
   hinge means for pivotably connecting said first and second arms together at the respective hinge ends, so that the arms can pivot between an open position and closed position;
   spring means cooperating with the first arm and the second arm for biasing the arms in an open position;
   gravity locking means comprising a captured pin means attached to the first arm and an aperture means attached to the second arm whereby the captured pin means comprises:
      a pin means slideable under the force of gravity, the pin means aligned substantially parallel with the first arm;
      and a containment means for allowing limited sliding motion of the pin means;
   and the aperture means comprises an engagement area where the slideable pin means may cause the gravity locking means to be engaged
   whereby the gravity locking means is disengageable when oriented such that gravity causes the gravity locking means to remain disengaged, and engageable when oriented such that gravity causes the gravity locking means to become engaged.

2. The lockable tongs of claim 1 wherein the locking means is engaged by applying force to the arms such that the grasping ends are in close proximity to each other while the tongs are oriented such that the slidable pin is moved by gravity to engage the locking means.

3. The lockable tongs of claim 1 wherein the locking means is disengaged by depressing the arms such that the grasping ends are in close proximity to each other while the tongs are oriented such that the slidable pin is moved by gravity to disengage the locking means.

4. The lockable tongs of claim 1 wherein the containment means comprises a C-shaped bracket having a first bracket leg, a base, and a second bracket leg.

5. The lockable tongs of claim 4 wherein the first bracket leg and the second bracket leg of the C-shaped bracket further comprises aperture means for locating the pin means therethrough.

6. The lockable tongs of claim 5 wherein the pin means comprises a pin member with a first pin end and a second pin end and a middle region, the middle region having increased diameter for a portion located between the pin ends.

7. The lockable tongs of claim 6 where the middle region of the pin member is contained between the first and second bracket legs with the pin ends extending through the apertures means of the first and second bracket legs.

8. The lockable tongs of claim 7 wherein the tongs are operable for a limited range of motion from the open to near closed position when the pin means is engageable.

9. The lockable tongs of claim 1 wherein the tongs are operable throughout the full range of motion when the pin means is disengageable.

10. The lockable tongs of claim 1 wherein the tongs are made of stainless steel.

11. The lockable tongs of claim 1 wherein the tongs are made of plastic.

* * * * *